(12) United States Patent
Luo et al.

(10) Patent No.: US 10,409,418 B2
(45) Date of Patent: Sep. 10, 2019

(54) ELECTRONIC DEVICE OPERATING ACCORDING TO PRESSURE STATE OF TOUCH INPUT AND METHOD THEREOF

(71) Applicant: Samsung Electronics Co., Ltd., Suwon-si, Gyeonggi-do (KR)

(72) Inventors: Hengliang Luo, Beijing (CN); Haifeng Deng, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/206,145

(22) Filed: Nov. 30, 2018

(65) Prior Publication Data

US 2019/0095040 A1   Mar. 28, 2019

Related U.S. Application Data

(63) Continuation of application No. 15/906,569, filed on Feb. 27, 2018, now Pat. No. 10,185,440, which is a
(Continued)

(30) Foreign Application Priority Data

Dec. 11, 2013   (CN) .......................... 2013 1 0676368

(51) Int. Cl.
*G06F 3/0488* (2013.01)
*G06F 3/041* (2006.01)

(52) U.S. Cl.
CPC .......... *G06F 3/0416* (2013.01); *G06F 3/0412* (2013.01); *G06F 3/0414* (2013.01); *G06F 3/0488* (2013.01); *G06F 2203/04105* (2013.01)

(58) Field of Classification Search
CPC .......... G02B 7/285; G02B 7/287; G02B 7/32; G02B 7/365; G03B 13/36;
(Continued)

(56) References Cited

U.S. PATENT DOCUMENTS 9,939,951 B2 *   4/2018   Luo ...................... G06F 3/0488
2010/0328230 A1   12/2010   Faubert et al.
(Continued)

FOREIGN PATENT DOCUMENTS

CN   102402364 A   4/2012
CN   102819350 A   12/2012
(Continued)

OTHER PUBLICATIONS

Chinese Office Action dated Sep. 27, 2018, issued in the Chinese Patent Application No. 201310676368.5.
(Continued)

*Primary Examiner* — Tony O Davis
(74) *Attorney, Agent, or Firm* — Jefferson IP Law, LLP

(57) ABSTRACT

An electronic device operating based on a touch input includes a touch screen for receiving the touch input; and a controller for determining a pressure state corresponding to the touch input, when the pressure state satisfies a first pressure condition, controlling the touch screen to display information relating to the touch input, and, when the pressure state satisfies a second pressure condition, performing a function corresponding to the touch input. A method of controlling an electronic device based on a touch input includes determining a pressure state of a touch input; when it is determined that the pressure state satisfies a first pressure condition, displaying information relating to the touch input; and when it is determined that the pressure state satisfies a second pressure condition, performing a function corresponding to the touch input.

20 Claims, 15 Drawing Sheets

Related U.S. Application Data continuation of application No. 15/166,997, filed on May 27, 2016, now Pat. No. 9,939,951, which is a continuation of application No. PCT/KR2014/012194, filed on Dec. 11, 2014.

(58) Field of Classification Search
CPC ......... G06F 2203/04105; G06F 3/0412; G06F 3/0414; G06F 3/0416; G06F 3/0488; G08B 13/196; H04N 5/2254; H04N 5/23212; H04N 5/23245; H04N 5/23296; H04N 5/332
USPC .................................................. 345/170–176
See application file for complete search history.

(56) References Cited

U.S. PATENT DOCUMENTS

| | | |
|---|---|---|
| 2011/0102336 A1 | 5/2011 | Seok et al. |
| 2011/0221694 A1 | 9/2011 | Karaoguz et al. |
| 2011/0310058 A1 | 12/2011 | Yamada et al. |
| 2012/0014601 A1 | 1/2012 | Jiang |
| 2012/0056848 A1 | 3/2012 | Yamano et al. |
| 2012/0274662 A1 | 11/2012 | Kim et al. |
| 2013/0060559 A1 | 3/2013 | Ryu et al. |
| 2013/0263254 A1 | 10/2013 | Seo et al. |
| 2013/0298073 A1 | 11/2013 | Kim |
| 2014/0028601 A1 | 1/2014 | Moore |
| 2015/0234493 A1 | 8/2015 | Parivar et al. |
| 2016/0274728 A1* | 9/2016 | Luo ........................ G06F 3/0488 |
| 2018/0188885 A1* | 7/2018 | Luo ........................ G06F 3/0488 |

FOREIGN PATENT DOCUMENTS

| | | |
|---|---|---|
| EP | 2 420 924 A2 | 2/2012 |
| WO | 2010/098118 A1 | 9/2010 |
| WO | 2011-090324 A2 | 7/2011 |

OTHER PUBLICATIONS

Chinese Office Action with English translation dated Apr. 10, 2019; Chinese Appln. No. 201310676368.5.

* cited by examiner

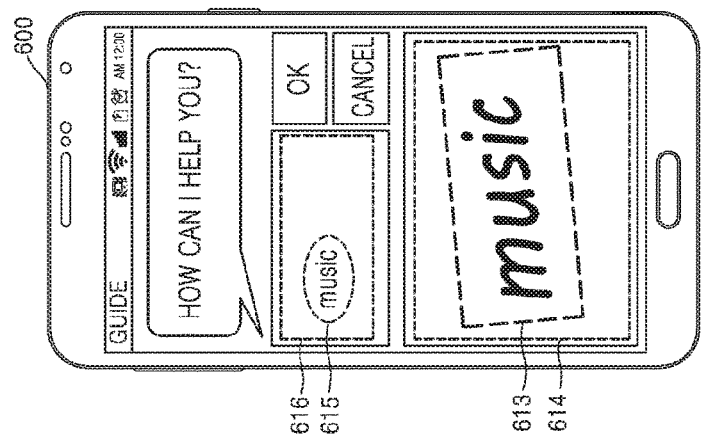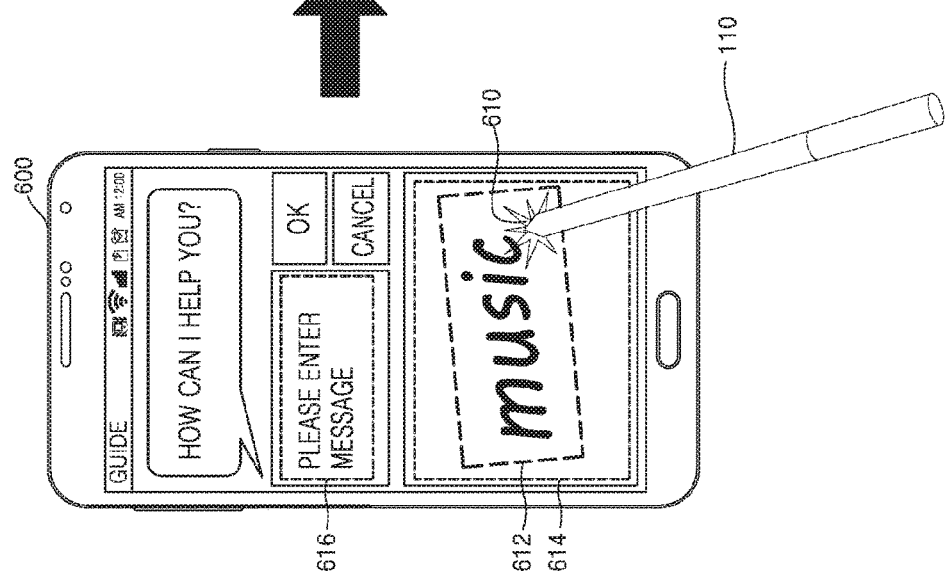

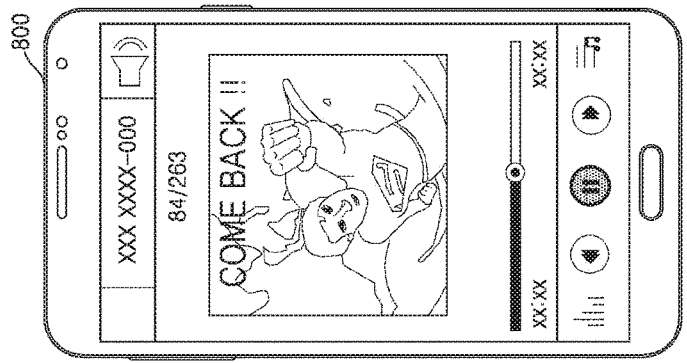
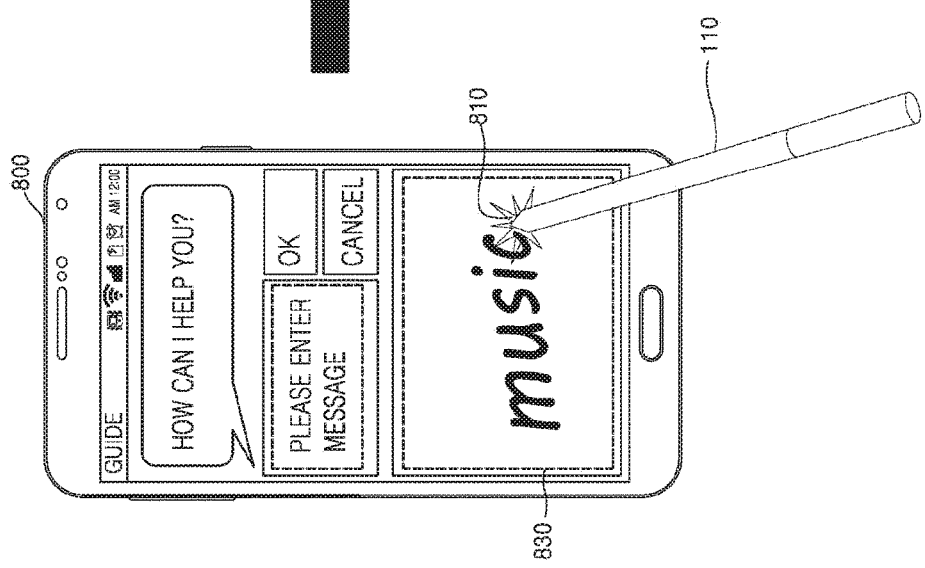

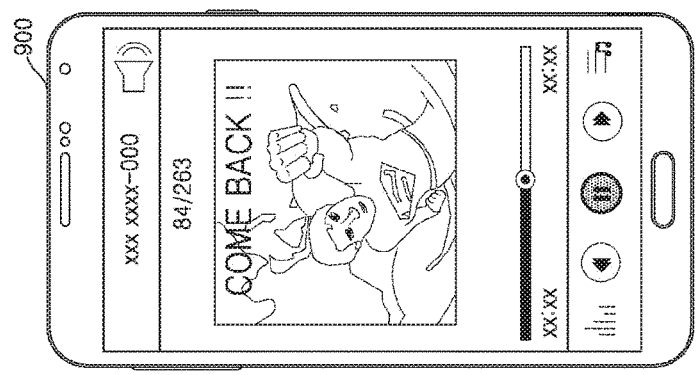
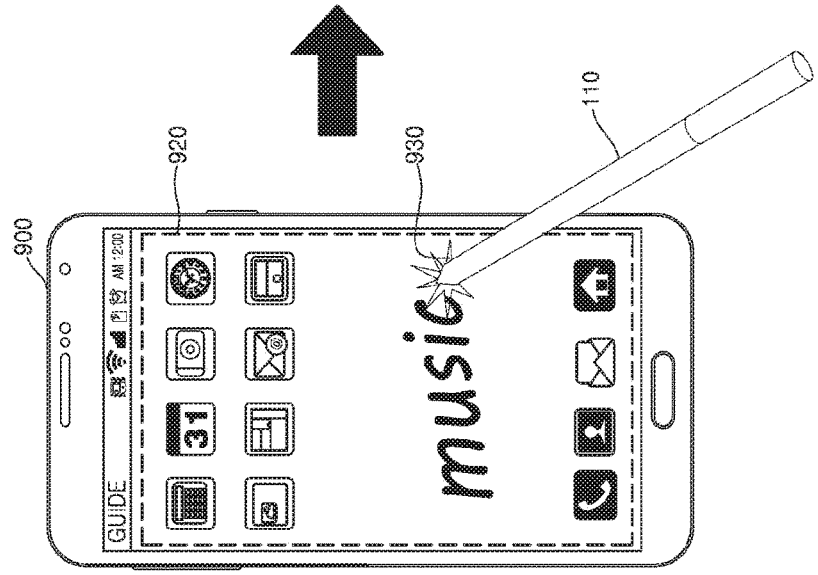

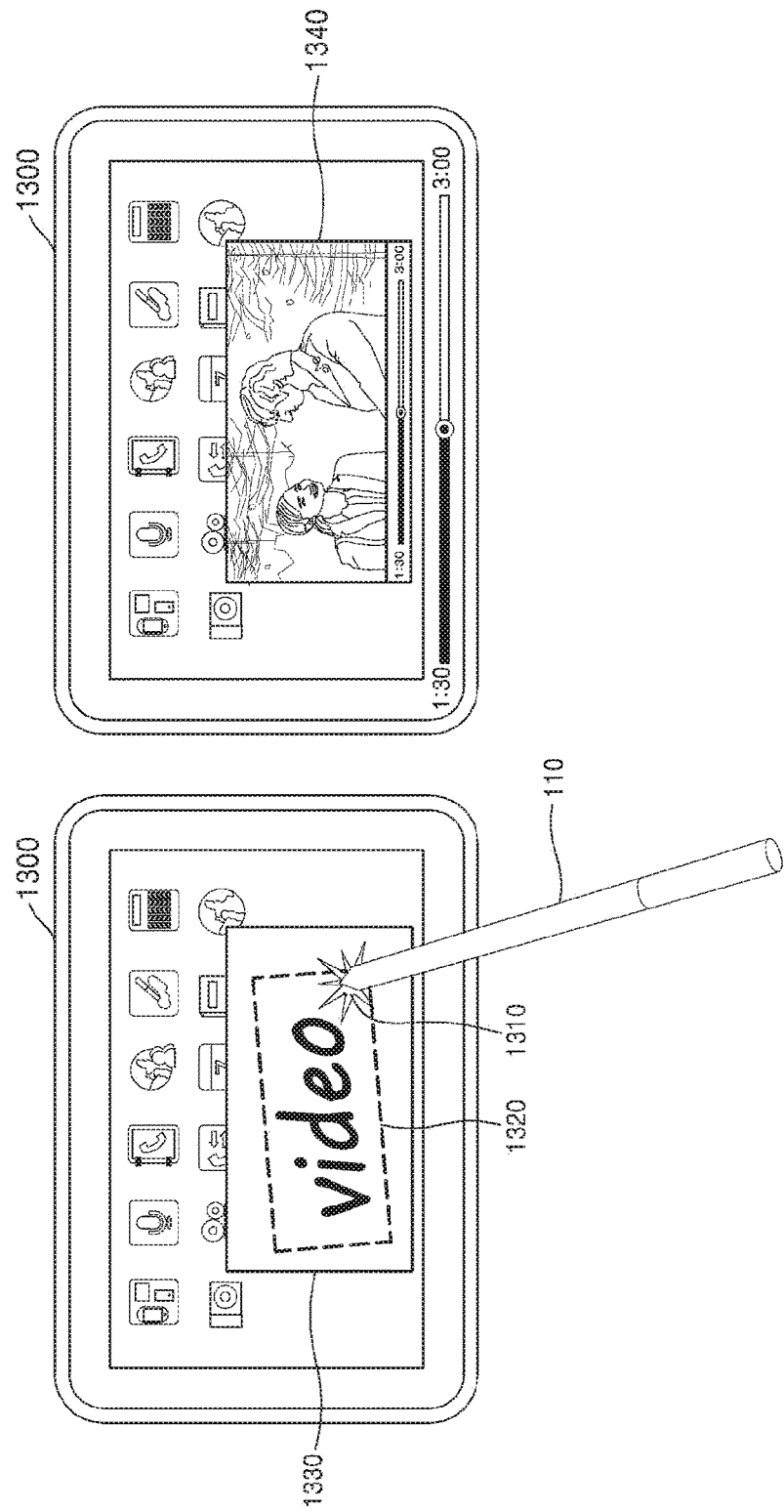

ELECTRONIC DEVICE OPERATING ACCORDING TO PRESSURE STATE OF TOUCH INPUT AND METHOD THEREOF

CROSS-REFERENCE TO RELATED APPLICATION(S)

This application is a continuation application of prior application Ser. No. 15/906,569, filed on Feb. 27, 2018, which is a continuation application of prior application Ser. No. 15/166,997, filed on May 27, 2016, which has issued as U.S. Pat. No. 9,939,951 on Apr. 10, 2018, which is a continuation application, claiming priority under § 365(c), of an International application filed on Dec. 11, 2014, and assigned application number PCT/KR2014/012194, which was based on and claimed the benefit of a Chinese patent application filed on Dec. 11, 2013, in the Chinese Patent Office and assigned Serial number 201310676368.5, the disclosures of which are incorporated by reference herein in their entirety.

TECHNICAL FIELD

The present disclosure relates to a method and a device for controlling an operation of an electronic device by using pressure applied during a touch input.

BACKGROUND

An electronic device according to a prior art may perform a specific function based on a touch input applied to a touch screen. The electronic device may perform an operation of detecting a coordinate of a signal based on a touch input on an input interface and executing an application, and selecting or controlling an object based on the signal applied to the coordinate. As the size of the touch screen of the electronic device increases, the electronic device is used as a notepad like preparing and storing arbitrary information on the large touch screen. Furthermore, the electronic device may operate by using not only the touch input but also information regarding pressure applied to the electronic device or a touch device by performing the touch input using the touch device.

However, in some cases, a user does not display specific information on an application icon according to the touch input but performs the touch input on the application icon so as to execute an application. In this case, the user may not achieve a touch purpose since the application is not executed and a graphic image corresponding to the touch input is prepared and displayed. In a contrary case, likewise, since the application is executed, the graphic image corresponding to the touch input is not displayed, and thus the user may not achieve the touch purpose. In this case, there is an inconvenience that the user manually performs a separate operation of leaving the input interface and then finding an application icon, and performing the touch input on the application icon.

SUMMARY

The present disclosure provides an electronic device capable of determining whether to display information relating to a touch input or perform a function corresponding to the touch input according to a pressure state corresponding to the touch input when the touch input is applied to a touch screen.

According to an aspect of the inventive concept, there is provided an electronic device operating based on a touch input, the electronic device including a touch screen for receiving the touch input; and a controller for determining a pressure state corresponding to the touch input, when the pressure state satisfies a first pressure condition, controlling the touch screen to display information relating to the touch input, and, when the pressure state satisfies a second pressure condition, performing a function corresponding to the touch input.

According to another aspect of the inventive concept, there is provided a method of controlling an electronic device based on a touch input, the method including determining a pressure state of a touch input; when it is determined that the pressure state satisfies a first pressure condition, displaying information relating to the touch input; and when it is determined that the pressure state satisfies a second pressure condition, performing a function corresponding to the touch input.

According to various embodiments provided by the inventive concept, a specific input condition satisfying a pressure state of a touch input among a plurality of pressure conditions may be determined so that whether to display information related to the touch input or perform a function corresponding to the touch input may be automatically determined.

BRIEF DESCRIPTION OF THE DRAWINGS

FIGS. 6A and 6B illustrate a process of displaying information relating to a touch input to an electronic device when a pressure state corresponding to the touch input satisfies a first pressure condition according to an embodiment.

FIGS. 8A and 8B illustrate a process of executing an application performing a function corresponding to a touch input to an electronic device when a pressure state corresponding to the touch input received on an input interface satisfies a second pressure condition.

FIGS. 9A and 9B illustrate a process of executing an application performing a function corresponding to a touch input when a pressure state corresponding to the touch input received on a touch screen satisfies a second pressure condition according to an embodiment.

FIGS. 13A and 13B illustrate an operation of an electronic device when an input interface in which a touch input is to be received is generated by producing a separate window on a screen and a pressure state of the touch input applied to the input interface satisfies a second pressure condition according to an embodiment of the inventive concept.

DETAILED DESCRIPTION

Figure 1:
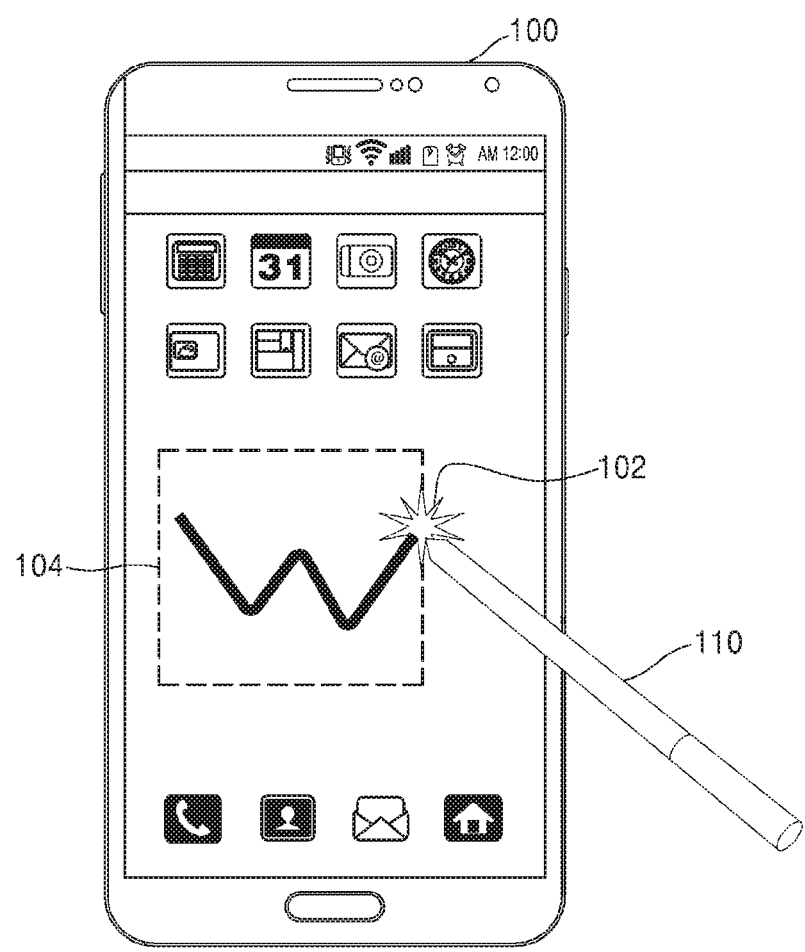
FIG. 1 illustrates a process of performing a touch input to an electronic device.

According to an aspect of the inventive concept, there is provided an electronic device operating based on a touch input, the electronic device including a touch screen for receiving the touch input; and a controller for determining a pressure state corresponding to the touch input, when the pressure state satisfies a first pressure condition, controlling the touch screen to display information relating to the touch input, and, when the pressure state satisfies a second pressure condition, performing a function corresponding to the touch input.

The pressure state may include at least one of a pressure magnitude corresponding to the touch input and a change pattern of the pressure size.

The controller may execute an application performing the function based on the touch input when the second pressure condition is satisfied.

The controller may determine at least one parameter relating to an execution of the application based on the pressure state and executes the application based on the at least one parameter.

The controller may perform a function corresponding to the information relating to the touch input when the pressure state satisfies the second pressure condition.

The controller may obtain information regarding a movement path of a touch device for inputting the touch input when the first pressure condition is satisfied and control the touch screen to display a graphic image corresponding to the information regarding the movement path.

The controller may convert the graphic image into at least one character string and control the touch screen to display the at least one character string.

The controller may control the touch screen to translate and display the at least one character string into another language based on the pressure state.

The controller may control the touch screen to display a visual indicator indicating the pressure state.

The controller may change a condition corresponding to the first pressure condition or the second pressure condition based on a user input.

According to another aspect of the inventive concept, there is provided a method of controlling an electronic device based on a touch input, the method including determining a pressure state of a touch input; when it is determined that the pressure state satisfies a first pressure condition, displaying information relating to the touch input; and when it is determined that the pressure state satisfies a second pressure condition, performing a function corresponding to the touch input.

The pressure state may include at least one of a pressure magnitude corresponding to the touch input and a change pattern of the pressure size.

The performing of the function corresponding to the touch input may include: executing an application performing the function based on the touch input.

The executing of the application may include: determining at least one parameter relating to an execution of the application based on the pressure state; and executing the application based on the at least one parameter.

The determining of the at least one parameter may include: determining the at least one parameter based on a pressure magnitude corresponding to the pressure state.

The displaying of the information relating to the touch input may include: obtaining information regarding a movement path of a touch device for inputting the touch input; and displaying a graphic image corresponding to the information regarding the movement path.

The displaying by converting may include: converting the graphic image into a character string based on the pressure state; and displaying the character string.

The displaying of the character string may include: translating the character string into another language; and displaying the translated character string.

The method may further include: displaying a visual indicator indicating the pressure state.

The method may further include; changing a condition corresponding to the first pressure condition or the second pressure condition based on a user input.

According to another aspect of the inventive concept, there is provided a non-transitory computer-readable recording medium having recorded thereon a computer program for executing a method of controlling an electronic device according to an embodiment of the inventive concept.

Advantages and features of the inventive concept and a method for achieving them will be clear with reference to the accompanying drawings, in which exemplary embodiments of the inventive concept are shown. The inventive concept may, however, be embodied in many different forms and should not be construed as being limited to the embodiments set forth herein; rather, these embodiments are provided so that this disclosure will be thorough and complete and will fully convey the concept of the inventive concept to those of ordinary skill in the art, and the inventive concept is defined by the scope of claims.

The terms used in the specification will be schematically described, and then, the inventive concept will be described in detail.

Although general current terms have been used to describe the inventive concept based on the functions in the inventive concept, the terms may vary according to the intention of one of ordinary skill in the art, case precedents, and the appearance of new technology. In addition, in specific situations, terms selected by the applicant may be used, and in these situations, the meaning of these terms will be disclosed in corresponding descriptions of the specification. Accordingly, the terms used in the specification to describe the inventive concept are defined not by their simple names but by their meanings in the context of the inventive concept.

In the specification, an expression in the singular includes an expression in the plural unless they are clearly different from each other in context.

In the specification, when a certain part "includes" a certain component, this indicates that the part may further include another component instead of excluding the other component unless there is different disclosure. In addition, a term such as " . . . unit" disclosed in the specification indicates a component including software or hardware, such as a Field Programmable Gate Array (FPGA) or an Application-Specific Integrated Circuit (ASIC), and the " . . . unit" performs certain roles. However, the " . . . unit" is not limited to software or hardware. The " . . . unit" may be configured to be included in an addressable storage medium or to reproduce one or more processors. Therefore, for example, the " . . . unit" includes components, such as software components, object-oriented software components, class components, and task components, processes, functions, attributes, procedures, subroutines, segments of program code, drivers, firmware, microcode, circuits, data, a database, data structures, tables, arrays, and variables. A function provided inside components and " . . . units" may combine them into a smaller number of components and " . . . units" or further divide them into additional components and " . . . units".

In the specification, the term "application" indicates a series of computer program codes designed to perform a specific task. Various applications may be described in the specification. For example, the applications may include a call application, a message application, a social network service (SNS) application, a game application, a video replay application, a map application, a memo application, a broadcast application, an exercise support application, a payment application, a photograph editing application, and the like but are not limited thereto.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. In the drawings, parts irrelevant to the description are omitted to clearly describe the inventive concept.

FIG. 1 illustrates a process of performing a touch input 102 on an electronic device 100. More specifically, the electronic device 100 may recognize whether the touch device 110 applies contact or pressure to a touch screen by using a touch panel provided on the touch screen. In this regard, the touch screen may be configured as a stack structure with the touch panel, and a method of recognizing whether there is a touch input may have various types such as a capacitive type, a resistive type, a piezoelectric type, etc., and thus the touch device 110 may be a stylus pen or a digitizer pen as shown in FIG. 1 or various conductors including a user's body through which a fine current flows, and furthermore, a tool through which no current flows. A method of measuring pressure in the electronic device 100 may be different depending on a type of the touch device 110. It will be understood that the method of applying pressure is not particularly limited in the inventive concept. The electronic device 100 may receive the touch input 102 on the touch screen and may display information relating to the touch input 102 on the touch screen. The touch input 102 may be a process of receiving a touch and a drag signal in the electronic device 100. According to an embodiment of the inventive concept, when a character is drawn by receiving the touch input 102, the character may be displayed as reference numeral 104.

Although the electronic device 100 is not input a letter on an input interface by using a qwerty keyboard on the touch screen, the electronic device 100 may receive the touch input 102 to input the letter like handwriting. The electronic device 100 may be input specific information (checking, underlining, emphasizing, etc.) by using the touch input 110 on a screen displayed on the touch screen. As described above, the electronic device 100 may be input the specific information and may display the specific information on the touch screen by using the touch input 102.

However, when a purpose of receiving the touch input 102 is not to input and display specific information but is that the touch device 110 receives the touch input 102 and allows the electronic device 100 to perform an arbitrary operation, the user may not achieve the purpose of the touch input 102. Thus, the electronic device 100 may determine a pressure state applied when the electronic device 100 receives the touch input 102 and may determine an operation of the electronic device 100 based on the received touch input 102 based on the pressure state. More specifically, the electronic device 100 may determine which condition the pressure state satisfies among certain pressure conditions, thereby determining an operation to be performed.

Figure 2:
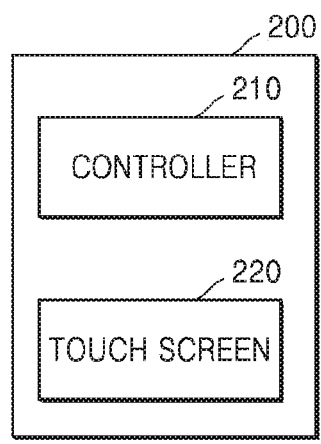
FIG. 2 is a block diagram of an electronic device according to an embodiment of the inventive concept.

FIG. 2 is a block diagram of an electronic device 100 according to an embodiment of the inventive concept. The electronic device 200 of FIG. 2 may correspond to the electronic device 100 of FIG. 1. The electronic device 200 may include a controller 210 and a touch screen 220. The electronic device 200 may receive a touch input through the touch screen 220. If the touch input is received in the touch screen 220, at the same time, a certain pressure may be applied onto the touch screen 220, and the electronic device 200 may obtain information regarding the pressure. The electronic device 200 may determine a pressure state corresponding to the touch input based on the information regarding the pressure and may determine which pressure condition the pressure state satisfies. The electronic device 200 may perform an operation corresponding to a satisfied pressure condition based on the touch input that is determined to satisfy the arbitrary pressure condition. Characteristics of the controller 210 and the touch screen 220 that perform operations of the electronic device 200 described above will now be described in detail below.

According to an embodiment of the inventive concept, if the controller 210 senses a touch input on the touch screen 220 of the electronic device 200, the controller 210 may determine a pressure state including information regarding a coordinate on the touch screen 220, on which the touch input is sensed, and information regarding a magnitude and a pattern of a pressure corresponding to the touch input. That is, the controller 210 may determine the pressure state corresponding to the touch input based on at least one of a pressure magnitude and a change pattern of the pressure magnitude.

According to an embodiment of the inventive concept, the controller 210 may refer to the pressure magnitude as the pressure state of the touch input, thereby determining if the pressure state for a magnitude of each pressure satisfies a pressure condition. In this regard, the pressure magnitude may be not only a pressure magnitude at a point but also an average pressure magnitude, a maximum pressure magnitude, or a minimum pressure magnitude from a point determined as a point where receiving of the touch input resumes to a point determined as a where the touch input ends. The point determined as the point where obtaining of the touch input resumes may be determined as point after a certain period of time from a point where the touch input is sensed but is not limited thereto. The point determined as where the touch input ends may also be determined as a point after a certain period of time from a point where the touch input is not sensed or may be determined by a user selection but is not limited thereto.

According to an embodiment of the inventive concept, the controller 210 may determine if the pressure state satisfies the pressure condition based on the change pattern of the pressure magnitude as the pressure state of the touch input. For example, the change pattern of the pressure magnitude may be changed from a strong pressure state to a weak pressure state, from the weak pressure state to the strong pressure state, from the strong pressure state to the weak pressure state to the strong pressure state again, or from the weak pressure state to the strong pressure state to the weak pressure state again. The change pattern of the pressure magnitude may be irregular since the pressure magnitude of the touch input on the touch screen 220 is directly performed by a user's hand, and thus the pressure state may be determined by using a change pattern of an average pressure magnitude value of a touch input applied presently from the point determined as the point where obtaining of the touch input resumes, thereby attenuating irregularity of the pattern. The controller 210 may determine the pressure state based on the information to determine if the touch input satisfies a certain pressure condition.

According to an embodiment of the inventive concept, a method that the controller 210 measures a pressure may use a method that the electronic device 200 directly measures the pressure or a method that the electronic device 200 receives information regarding the pressure relating to a touch input measured by the touch device 110. More specifically, as the method that the electronic device 200 directly measures the pressure, a method of measuring a pressure applied to the touch screen 220 by using a pressure sensor included in the electronic device 200 or a method of generating pressure information by comparing magnitudes of contacted areas of the touch screen 220 may be used. As the method that the electronic device 200 receives the information regarding the pressure related to the touch input measured by the touch device 110, a method of determining the pressure state by receiving the information regarding the pressure of the touch input from the touch device 110 by using the touch input 110 capable of measuring the pressure may be used. However, the method of determining the pressure state is not limited thereto. The controller 210 may determine the pressure state by using the information regarding the pressure corresponding to the touch input, thereby determining if the pressure state satisfies the certain pressure condition.

According to an embodiment of the inventive concept, the controller 210 may control the electronic device 200 based on a touch input satisfying an arbitrary pressure condition. A method that the controller 210 controls the electronic device 200 based on a touch input according to a pressure condition will now be described in detail based on the following embodiments below.

Figure 3:
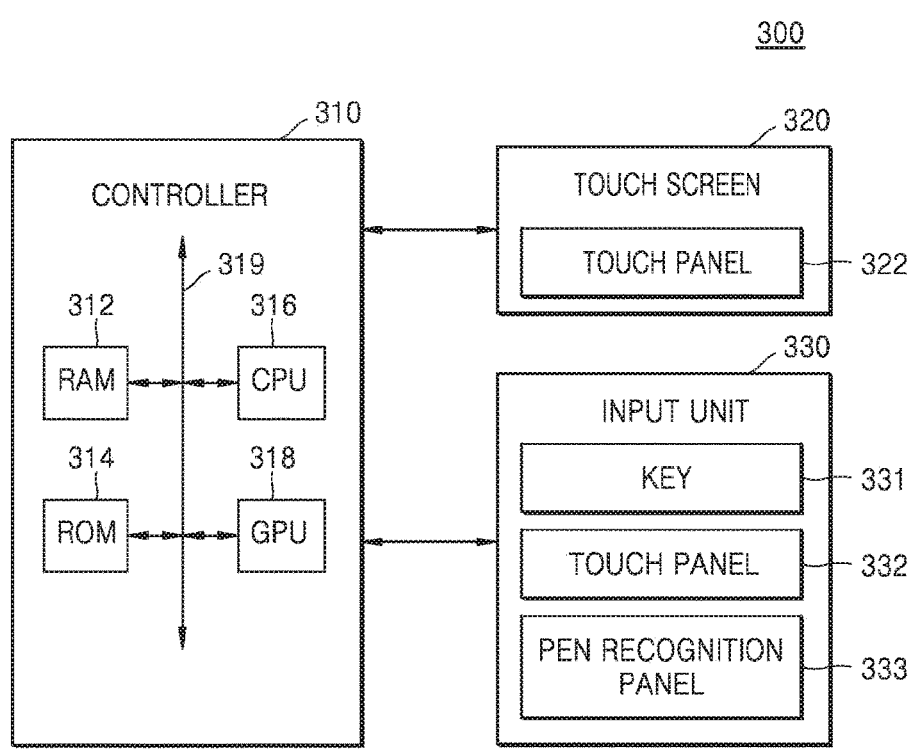
FIG. 3 is a detailed block diagram of an electronic device according to an embodiment of the inventive concept.

FIG. 3 is a detailed block diagram of the electronic device 200 FIG. 2. The electronic device 200 may include at least one of a controller 310, a touch screen 320, and an input unit 330.

The touch screen 320 may include a display panel 322 and a controller (not shown) controlling the display panel 322. The touch screen 320 of FIG. 3 may correspond to the touch screen 220 of FIG. 2. The display panel 322 may be implemented as a display of various types such as a liquid crystal display (LCD), an organic light-emitting diode (OLED) display, an active matrix organic light-emitting diode (AMOLED), a plasma display panel (PDP), etc. The display panel 322 may be flexible, transparent, or wearable. The touch screen 320 may be provided as a touch screen (not shown) by being combined with a touch panel 332 of the touch input 330. For example, the touch screen (not shown) may include an integral module that combines the display panel 322 with the touch panel 332 in a stack structure.

The controller 310 may control the touch screen 320 to display content on the touch screen 320. In other words, the controller 310 may display a part of the content on the touch screen 320. The controller 310 of FIG. 3 may correspond to the controller 210 of FIG. 2. The controller 310 may include at least one of RAM 312, ROM 314, a CPU 316, a graphics processing unit (GPU) 318, and a bus 319. The RAM 312, the ROM 314, the CPU 316, and the GPU 318 may be connected to each other via the bus 319.

The CPU 316 may access memory and perform booting by using an operating system (OS) stored in the memory. The CPU 316 may perform various operations by using various programs, contents, data, etc. stored in the memory.

The ROM 314 may store a command set for system booting. As an example, if a turn-on command is input and then power is supplied to the electronic device 200, the CPU 316 may copy the OS stored in the memory to the RAM 312 according to a command stored in the ROM 314 and may execute the OS to boot a system. If booting is complete, the CPU 316 may copy various programs stored in the memory to the RAM 312 and may execute the programs copied to the RAM 312 to perform various operations. If the electronic device 200 is completely booted, the GPU 318 may display a UI screen on a region of the touch screen 320. More specifically, the GPU 318 may generate a screen displaying an electronic document including various objects such as content, icons, menus, etc. The GPU 318 may calculate an attribute value such as a coordinate value, a shape, a magnitude, a color, etc. by which each object is to be displayed according to a layout of the screen. The GPU 318 may generate a screen of various layouts including the objects based on the calculated attribute value. The screen generated by the GPU 318 may be provided to the touch screen 320 and displayed on each region of the touch screen 320.

The input unit 330 may receive various command inputs from a user. The input unit 330 may include at least one of a key 331, a touch panel 332, and a pen recognition panel 333. The key 331 may include various types of keys such as a mechanical button, a wheel, etc. formed on various regions such as a front portion of a body of the electronic device 200, a side portion, a rear portion, etc.

The touch panel 332 may sense a touch input of the user and may output a touch event value corresponding to the sensed touch signal. When the touch panel 332 is combined with the display panel 3322 to configure a touch screen (not shown), the touch screen may be implemented as various types of touch sensors such as a capacitive type, a resistive type, a piezoelectric type, etc. The capacitive type is a type calculating a touch coordinate by sensing fine electricity caused by a user' body when a part of the user's body touches a surface of the touch screen by using a dielectric material coated on the surface of the touch screen. The resistive type is a type calculating the touch coordinate by sensing current that flows when the user touches a screen by using two electrode plates embedded in the touch screen and thus upper and lower plates of a touch point contact each other. Although a touch event generated on the touch screen mainly occurs by a human finger, it may also occur by an object of a conductive material capable of varying capacitance.

The pen recognition panel 333 may sense a proximity input or a touch input of a touch pen (for example, a stylus pen or a digitizer pen) of the user according to an operation of the touch pen and may output a sensed pen proximity event or pen touch event. The pen recognition panel 333 may be implemented in, for example, an EMR manner, and may sense the touch input or the proximity input of the touch pen according to an intensity variation of an electromagnetic field by a proximity or a touch of the touch pen. In more detail, the pen recognition panel 333 may include an electromagnetic induction coil sensor (not shown) having a grid structure and an electromagnetic signal processor (not shown) that sequentially provides an alternating signal having a certain frequency to each loop coil of the electromagnetic induction coil sensor. If a pen including a resonance circuit is near a loop coil of the pen recognition panel 333, a magnetic field transmitted from the corresponding loop coil may generate current based on interactive electromagnetic induction to the resonance coil included in the touch pen. Based on the current, an induction magnetic field may be generated from a coil constituting the resonance circuit included in the touch pen, and the pen recognition panel 333 may detect the induction magnetic field from the loop coil in a signal receiving state to sense an approach location or a touch location of the touch pen. The pen recognition panel 333 may be provided to have a certain area in a lower portion of the display panel 322, for example, an area covering a display region of the display panel 322.

Figure 4:
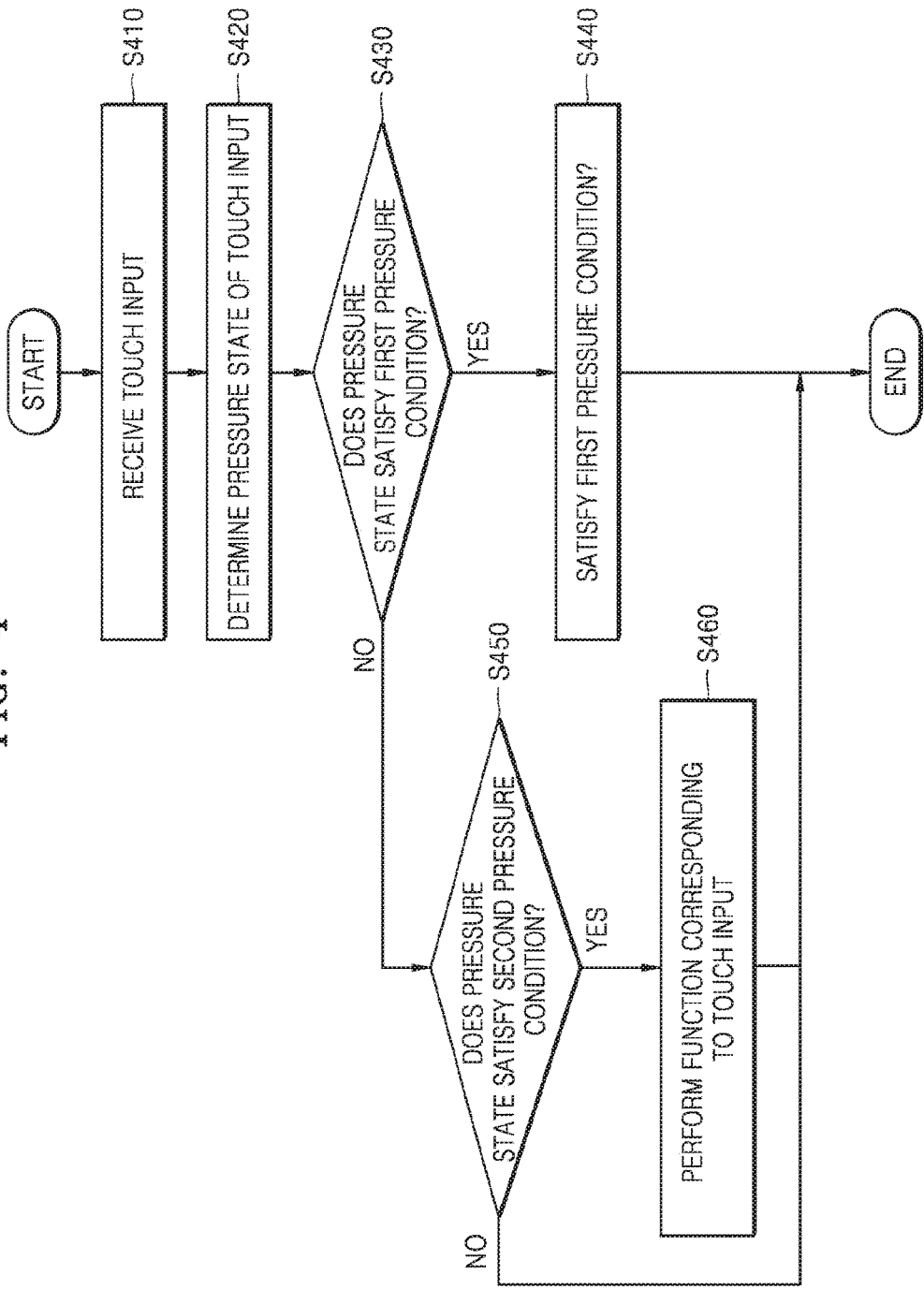
FIG. 4 is a flowchart of a method of controlling an electronic device according to an embodiment of the inventive concept.

FIG. 4 is a flowchart of a method of controlling the electronic device 200, according to an embodiment of the inventive concept. More specifically, the method of controlling the electronic device 200 may control the electronic device 200 based on which pressure condition a pressure state of a touch input satisfies.

In operation S410, the electronic device 200 may receive the touch input on the touch screen 220. According an embodiment of the inventive concept, the touch input may be received by a touch device 110. In particular, when the touch screen 220 of the electronic device 200 is a capacitive type, the touch device 110 may be a unit such as a user's body through which current flows and may be a stylus pen or a digitizer pen that may interact with the electronic device 200. Furthermore, when the touch screen 220 is a resistive type, the touch device 110 may be used irrespective of whether current flows.

In operation S420, the electronic device 200 may determine the pressure state with respect to the touch input on the touch screen. According to an embodiment of the inventive concept, the pressure state may be at least one of a pressure magnitude and a change pattern of the pressure magnitude. The pressure magnitude related to the pressure state may be not only a pressure magnitude at a point but also an average pressure magnitude, a maximum pressure magnitude, or a minimum pressure magnitude from a point determined as a point where receiving of the touch input resumes to a point determined as a where the touch input ends. The electronic device 200 may determine whether the pressure state satisfies the pressure condition based on the change pattern of the pressure magnitude as the pressure state of the touch input. For example, a change pattern of the touch input may be changed from a strong pressure state to a weak pressure state, from the weak pressure state to the strong pressure state, from the strong pressure state to the weak pressure state to the strong pressure state again, or from the weak pressure state to the strong pressure state to the weak pressure state again. The pressure state may be a combination of the pressure magnitude and the change pattern of the pressure magnitude. For example, a pressure state in which a pressure magnitude is determined as 100 and the change pattern of the pressure magnitude changes from a strong state to a weak state may be determined to be different than a pressure state in which a pressure magnitude is determined as 200 and the change pattern of the pressure magnitude changes from the strong state to the weak state. The pressure state in which the pressure magnitude is determined as 100 and the change pattern of the pressure magnitude changes from the strong state to the weak state may be determined to be different than a pressure state in which a pressure magnitude is determined as 200 and the change pattern of the pressure magnitude changes from the weak state to the strong state.

In operation S430, the electronic device 200 may determine if the pressure state satisfies a first pressure condition based on the pressure state determined in operation S420. For example, when a pressure state in which a pressure magnitude is less than 100 is set to satisfy the first pressure condition, if the pressure magnitude is 50 in the pressure state determined in operation S420, the electronic device 200 may determine that the pressure state satisfies the first pressure condition. For another example, when a pressure state in which a pressure magnitude is less than 100 and a change pattern of the pressure magnitude changes from the strong state to the weak state is set to satisfy the first pressure condition, a pressure state in which a pressure magnitude is 50 and a change pattern of the pressure magnitude changes from the strong state to the weak state may be determined to satisfy the first pressure condition. However, although the change pattern of the pressure magnitude changes from the strong state to the weak state, the pressure state in which the pressure magnitude corresponds to 150 may be determined not to satisfy the first pressure condition. A pressure state in which a pressure magnitude is 50 and a change pattern of the pressure magnitude changes from the weak state to the strong state may be determined not to satisfy the first pressure condition.

When the pressure state is determined to satisfy the first pressure condition in operation S430, in operation S440, the electronic device 200 may display information relating to the touch input on the touch screen 220. According to an embodiment of the inventive concept, the information relating to the touch input may be a graphic image indicating a movement path of the touch device 110 that receives the touch input on the touch screen 220. According to another embodiment of the inventive concept, the information relating to the touch input may be input to an input interface when the touch device 110 receives the touch input on the input interface and may be displayed on the touch screen 220. This will be described with reference to FIG. 5, FIGS. 6A and 6B below.

Figure 5:
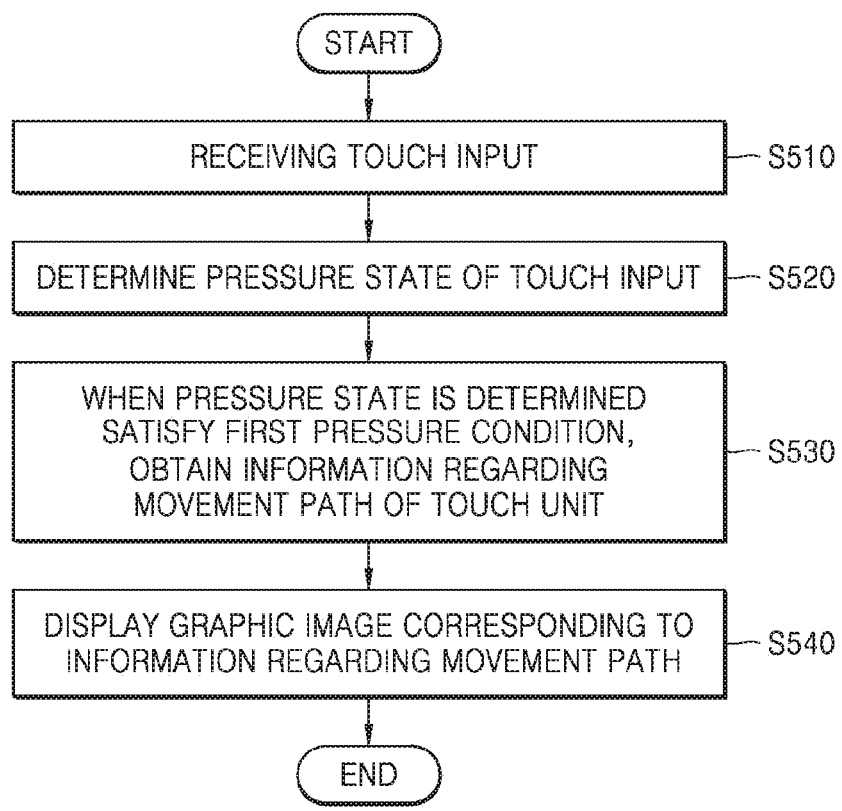
FIG. 5 is a flowchart of a method of controlling an electronic device when a pressure state corresponding to a touch input satisfies a first pressure condition according to an embodiment.

FIG. 5 is a flowchart of a method of controlling an electronic device when a pressure state corresponding to a touch input satisfies a first pressure condition according to an embodiment. And FIGS. 6A and 6B illustrate a process of displaying information relating to a touch input to an electronic device 600 when a pressure state corresponding to the touch input satisfies a first pressure condition according to an embodiment.

In operation S510, the electronic device 200 may receive a touch input on the touch screen 220. This may correspond to operation S410 of FIG. 4, and thus a detailed description of operation S510 is omitted. The electronic device 600 of FIGS. 6A and 6B may correspond to the electronic device 200 of FIG. 2. Referring to FIG. 6A, the electronic device 600 may display an input interface 614 or 616 for inputting arbitrary information to the touch screen 220. A user of the electronic device 600 may input the arbitrary information to the input interfaces 614 or 616 by performing a keyboard input or touch and drag inputs. For example, the user may personally input characters to the input interface 616 by using a QWERTY keyboard and may receive the touch and drag inputs in the input interface 614 by using the touch device 110. Referring to FIG. 6A, a touch input 610 may be received by the input interface 614 by using the touch device 110, thereby acknowledging that the touch input 610 corresponding to a word "music" is received on the touch screen 220 of the electronic device 600.

In operation S520, the electronic device 200 may determine a pressure state regarding the touch input on the touch screen. This may correspond to operation S420 of FIG. 4, and thus a detailed description of operation S520 is omitted. In this case, a pressure state corresponding to the touch input 610 may be determined to satisfy the first pressure condition.

In operation S530, when the pressure state satisfies a first pressure condition based on the pressure state determined in operation S520, the electronic device 200 may obtain information regarding movement path of touch unit. And in operation S540, the electronic device 200 may display graphic image corresponding to information regarding movement path. The controller 210 of the electronic device 200 may display information relating to the touch input 610 on the touch screen 220 by the touch input 610 satisfying the first pressure condition. Referring to FIG. 6B, the information relating to the touch input 610 satisfying the first pressure condition may be displayed on the touch screen 220 as a graphic image. A graphic image 613 may be a graphic image corresponding to a movement path of the touch device 110 that moves when the touch input 610 of FIG. 6A is received. As an embodiment of the inventive concept, referring to FIG. 6A, when the graphic image 613 corresponding to the movement path of the touch device 110 that moves while performing the touch input 610 on the input interface 614 is recognizable as characters, a recognized character string may input to and displayed on the input interface 616. Referring to FIG. 6B, when the graphic image 613 obtained by receiving the touch input 610 by the input interface 614 is converted into the character string by using a character recognition function, a character string "music" may be obtained, and a character string obtained as the information relating to the touch input 610 may be displayed on the input interface 616 as "music". A method of converting a graphic image corresponding to the movement path of the touch device 110 that performs the touch input 610 into a character string by using the character recognition function may be a method of using an optical character reader (OCR) function but is not limited thereto. As another example, any method of converting an image into characters may be used, such as a character conversion method of reviewing similarity between the graphic image corresponding to the touch input 610 and a preset form, if the similarity is determined to be greater than a preset threshold value, considering the graphic image to correspond to the preset form, and converting the graphic image into characters corresponding to the preset form.

As an embodiment of the inventive concept, when the touch input 610 received by an input interface corresponds to a character string, the electronic device 600 may control the touch screen 220 to translate the character string into another language and display the character string, For example, when the graphic image 613 corresponding to the movement path of the touch device 110 that moves while performing the touch input 610 is recognizable as characters on the input interface 614 and the characters correspond to "music", the electronic device 600 may translate the characters "music" into other languages, Korean, Japanese, etc. and may display the characters on the input interface 614. The electronic device 600 may set a language that is to perform translation in advance. For convenience of description, it will be described below on the assumption that the electronic device 600 is set to translate and display an obtained character string into Korean when the character string is English. Furthermore, when the touch input 610 is received, whether to translate and display the touch input 610 or whether to display the touch input 610 as a character string obtained through the character recognition function based on a graphic image 612 without translating the touch input 610 may be determined based on a pressure state corresponding to the touch input 610. As an embodiment of the inventive concept, on an assumption that when a magnitude X of the touch input 610 is less than A, the first pressure condition is satisfied, when X is less than A and simultaneously is greater than 0 and less than a1, the electronic device 600 may be set to display the character string obtained as the information relating to the touch input 610 as the character string is, and when X is greater than a1 and less than A, may be set to translate and display the obtained character string into a preset language. Referring to FIG. 6A, if a pressure magnitude corresponding to the received touch input 610 is greater than a1 and less than A, unlike FIG. 6B, a word " 음악 " translated into Korean from the character string "music" obtained by the touch input 610 received by the input interface 614 may be automatically input to and displayed on the input interface 616.

When the pressure state is determined not to satisfy the first pressure condition in operation S430, in operation S450, the electronic device 200 may determine whether the pressure state satisfies a second pressure condition. Specifically, when the first pressure condition is satisfied and the second pressure condition is satisfied, since the electronic device 200 may perform different operations, a user of the electronic device 200 may adjust pressure during a touch input, thereby differently controlling the electronic device 200 by the touch input.

According to an embodiment of the inventive concept, when the first pressure condition is set as a case where a pressure magnitude corresponding to the pressure state is less than 100, and the second pressure condition is set as a case where a pressure magnitude corresponding to the pressure state is greater than 100, if a pressure magnitude corresponding to the pressure state determined in operation S420 is 150, the first pressure condition may not be satisfied but the second pressure condition may be determined to be satisfied. According to another embodiment, if the first pressure condition is a case where the pressure magnitude corresponding to the pressure state is less than 100 and a change pattern of the pressure magnitude changes from a strong state to a weak state, and the second pressure condition is a case where the pressure magnitude corresponding to the pressure state is greater than 100 and a change pattern of the pressure magnitude changes from the strong state to the weak state, when the pressure magnitude corresponding to the pressure state determined in operation S420 is 150 and the change pattern of the pressure magnitude changes from the strong state to the weak state, the first pressure condition may not be satisfied but the second pressure condition may be determined to be satisfied.

In operation S460, the electronic device 200 may perform a function corresponding to a touch input satisfying the second pressure condition based on the touch input. More specifically, the function corresponding to the touch input may be a function of selecting and executing an object such as an icon at a coordinate on the touch screen 220 of the electronic device 200 in which the touch input is received and, when a graphic image related to the touch input is converted into a character string, a function of executing an application performing a function corresponding to the character string or changing a job environment (for example, a sound magnitude, a screen brightness, a screen size, etc.) of a system of the electronic device 200.

According to an embodiment of the inventive concept, the electronic device 200 may perform a function related to information relating to the touch input that is to be displayed when the first pressure condition is satisfied as a function corresponding to the touch input when the second pressure condition is satisfied. That is, the electronic device 200 may display the information relating to the touch input by the touch input satisfying the first pressure condition and may further perform the function corresponding to the information relating to the touch input, thereby directly executing another application and directly changing the system environment of the electronic device 200 without having to leave an input interface. The electronic device 200 may review the similarity between a graphic image, on which the touch input is performed, and a preset form, if the similarity is determined to be greater than a preset threshold value, considering the graphic image to correspond to the preset form, and perform a function corresponding to the preset form in order to determine the function corresponding to the information relating to the touch input.

Figure 7:
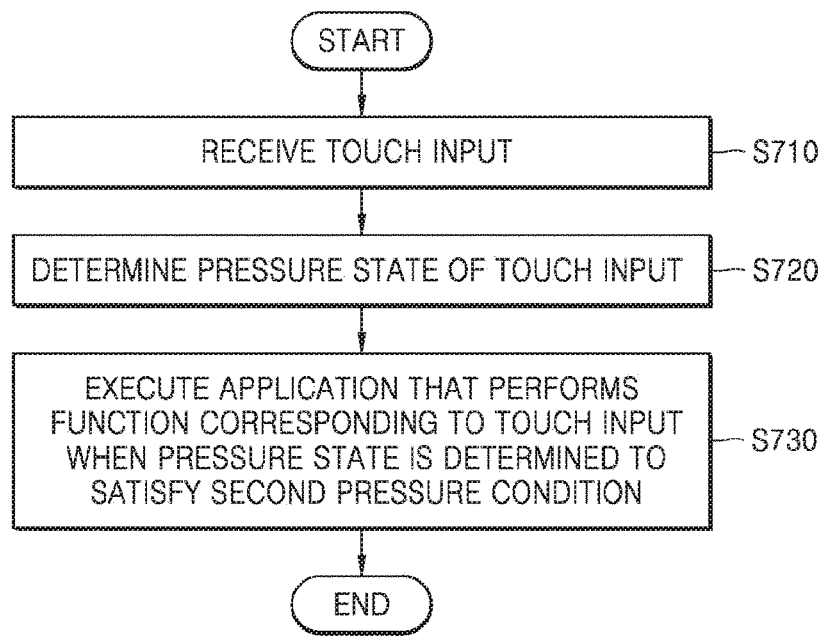
FIG. 7 is a flowchart of a method of controlling an electronic device when a pressure state corresponding to a touch input satisfies a second pressure condition according to an embodiment.

FIG. 7 is a flowchart of a method of controlling the electronic device 200 when a pressure state corresponding to a touch input satisfies a second pressure condition according to an embodiment. In FIG. 7, it is assumed that the pressure state corresponding to the touch input does not satisfy a first pressure condition but satisfies the second pressure condition.

In operation S710, the electronic device 200 may receive a touch input on the touch screen 220. This may correspond to operation S410 of FIG. 4, and thus a detailed description of operation S710 is omitted.

In operation S720, the electronic device 200 may determine a pressure state regarding the touch input on the touch screen. This may correspond to operation S420 of FIG. 4, and thus a detailed description of operation S720 is omitted.

In operation S730, the electronic device 200 may execute an application that performs a function corresponding to information relating to the touch input received in operation S710 when the pressure state determined in operation S720 is determined to satisfy the second pressure condition according to an embodiment of the inventive concept. For example, when a touch input corresponding to a character string "music" is received, the electronic device 200 may execute a music play application to perform a "music play" function that is a function corresponding to "music". This will be described in more detail with reference to FIGS. 8A and 8B.

FIGS. 8A and 8B illustrate a process of executing an application performing a function corresponding to a touch input to an electronic device 800 when a pressure state corresponding to the touch input received on an input interface satisfies a second pressure condition. The electronic device 800 of FIGS. 8A and 8B may correspond to the electronic device 200 of FIG. 2.

Referring to FIG. 8A, the electronic device 800 may display an input interface 830 for inputting arbitrary information to the touch screen 220. A user of the electronic device 800 may input the arbitrary information to the input interface 830 by using a touch input. For example, touch and drag inputs may be received by the input interface 830. Referring to FIG. 8A, it may be acknowledged that information corresponding to a word "music" is input to the input interface 830 of the electronic device 800 by receiving the touch input 810 by the input interface 830. That is, the electronic device 800 may receive a touch input 810 corresponding to the pressure state satisfying the second pressure condition by the input interface 830. Thus, the electronic device 800 may receive touch and drag signals corresponding to a character shape of "music" as the touch input 810 and may perform a function corresponding to the touch input 810 that is "music". The function corresponding to the touch input that is "music" may be "music play", and thus the electronic device 200 may execute a music play application that may perform a music play function if a pressure state of the touch input 810 is determined to satisfy the second pressure condition. As an embodiment of the inventive concept, information input to the input interface 830 by the touch input 810 corresponds to characters "music" or an image having a shape of the characters may be implemented by using not only a method of converting information input by the touch input 810 into a character string such as an OCR but also various image processing methods. The music play application for performing the music play function may be set by a user in advance. Although the electronic device 800 executes applications that may perform a plurality of music play functions, the electronic device 800 may automatically execute a preset application among the applications. The electronic device 800 may execute the music play application corresponding to "music" by the touch input 810 like FIG. 8B based on the touch input 810 of FIG. 8A.

FIGS. 9A and 9B illustrate a process of executing an application performing a function corresponding to information relating to a touch input when a pressure state corresponding to the touch input received on the touch screen 220 satisfies a second pressure condition according to an embodiment of the inventive concept. An electronic device 900 of FIGS. 9A and 9B may correspond to the electronic device 200 of FIG. 2. More specifically, the electronic device 900 may include an input interface 920 on an arbitrary screen displayed on the touch screen 220 although the input interface 920? is not an input interface on which character strings may be disposed. For example, an input interface that may input and display arbitrary information on a screen currently displayed on the touch screen 220 may be implemented. Referring to FIG. 9A, the screen displayed on the touch screen 220 of the electronic device 900 may correspond to a home screen of the electronic device 900 that does not have an input interface for inputting a character string thereto. However, when the touch device 110 that may interact with the electronic device 900 is used, the function of receiving a touch input 930 such as touch and drag inputs and inputting the arbitrary information to the screen may be provided on a screen that does not provide the input interface of the touch screen 220 for inputting the character string in relationship with the touch device 110. Accordingly, since the input interface 920 may also be provided on the home screen of the electronic device 900, when the touch input 930 is received according to a shape corresponding to characters "music" in the screen of the touch screen 220 that displays the home screen having no character string input interface, the electronic device 900 may determine a pressure state corresponding to the touch input 930 and may determine which pressure condition the determined pressure state satisfies between a first pressure condition and a second pressure condition. When the pressure state corresponding to the touch input 930 satisfies the first pressure condition, the electronic device 900 may display a graphic image corresponding to the characters "music" on the screen displayed on the touch screen 220 of the electronic device 900 as information relating to the touch input 930. This may be useful in that a user may input and display desired information on a currently displayed arbitrary screen of the touch screen 220. According to an embodiment of the inventive concept, when the pressure state corresponding to the touch input 930 satisfies the second pressure condition, the electronic device 900 may execute an application performing a function corresponding to the touch input 930. As shown in FIG. 9A, the shape corresponding to the characters "music" may be received as the touch input 930 on the touch screen 220. In this case, the electronic device 900 may execute a music play application performing a music play function that is a function corresponding to the touch input 930.

Figure 10C:
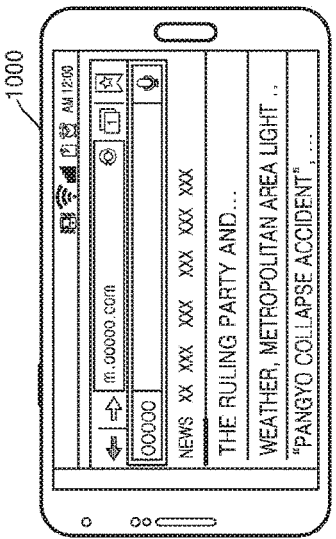
FIGS. 10A, 10B, and 10C illustrate a process of operating an electronic device when a pressure state corresponding to a touch input satisfies a first pressure condition or a second pressure condition according to an embodiment of the inventive concept.
Figure 10B:
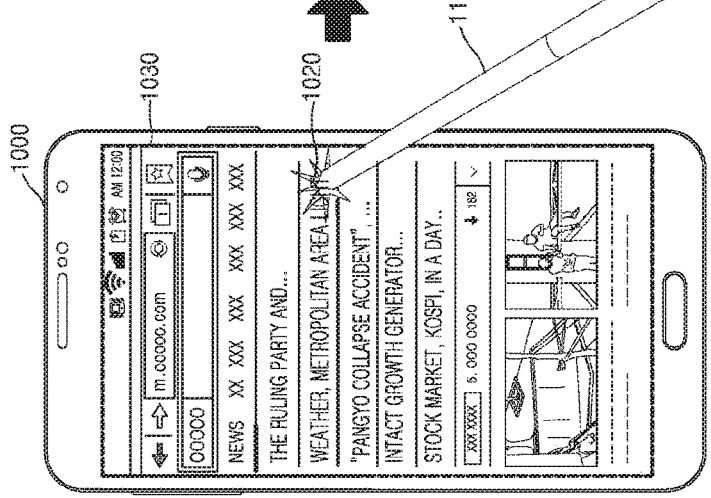
Figure 10A:
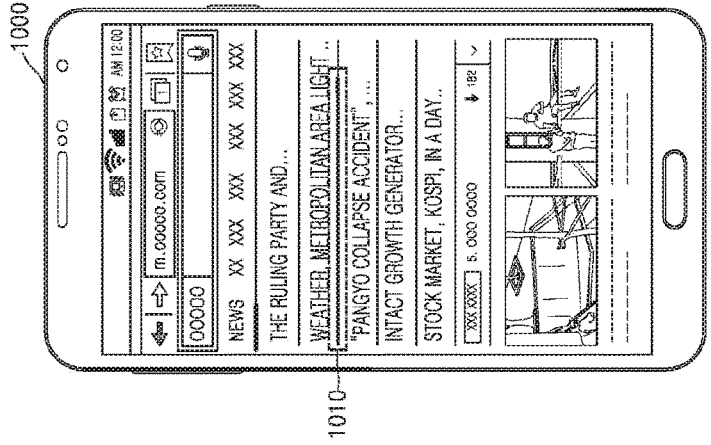

FIGS. 10A, 10B, and 10C illustrate a process of operating an electronic device when a pressure state corresponding to a touch input satisfies a first pressure condition or a second pressure condition according to an embodiment of the inventive concept. More specifically, as an embodiment of the inventive concept, an electronic device 1000 may perform a function corresponding to an identical gesture motion when it is determined that not only a touch input having a character form but also a touch input corresponding to various preset gesture motions are received. The electronic device 1000 of FIGS. 10A, 10B, and 10C may correspond to the electronic device 200 of FIG. 2.

The electronic device 1000 may provide various application execution screens on the touch screen 220. For example, the electronic device 1000 may provide functions such a reading, Internet, game, gallery, dictionary, etc. Referring to FIG. 10B corresponding to an embodiment of the inventive concept, an Internet screen may be displayed on the touch screen 220 of the electronic device 1000. The electronic device 1000 may provide an input interface for inputting an Internet search word on the touch screen 220. For example, an input interface using a QWERTY keyboard or an input interface using the touch device 110 may be provided. According to an embodiment of the inventive concept, the electronic device 1000 may receive a touch input 1020 based on a touch operation on the touch screen 220 that provides an Internet screen of the touch device 110. In this case, the electronic device 1000 may provide a full screen of the touch screen 220 that displays the Internet screen as the input interface 1030 by using the touch device 110 that interacts with the electronic device 1000. The electronic device 1000 may provide the Internet screen on the touch screen 220 and may provide the input interface 1030 on the Internet screen. The electronic device 1000 may determine a pressure state corresponding to the touch input 1020 and may determine if the determined pressure state satisfies a first pressure condition or a second pressure condition. Referring to FIGS. 10A and 10B, when it is determined that the pressure state corresponding to the touch input 1020 satisfies the first pressure condition, the electronic device 1000 may control the touch screen 220 to display information relating to the touch input 1020. In FIG. 10A, the electronic device 1000 may display a horizontal solid line under a news headline as the information relating to the touch input 1020. The electronic device 1000 may receive the touch input 1020 on the screen of the touch screen 220 to input and display arbitrary information on a desired portion and may further perform a screen capture function to separately store a displayed screen. Referring to FIGS. 10A and 10C, when it is determined that the pressure state corresponding to the touch input 1020 satisfies the second pressure condition, the electronic device 1000 may perform a function corresponding to the touch input 1020. According to an embodiment of the inventive concept, when it is determined that the pressure state corresponding to the touch input satisfies the second pressure condition, the electronic device 1000 may change a system environment of the electronic device 1000 as a function corresponding to the information relating to the touch input. The system environment may mean a general operating environment of the electronic device 1000 provided by an operating system of the electronic device 1000. For example, a function of changing the system environment may include a screen brightness control, a screen size control, a volume control, a screen rotation, etc. In FIG. 10A, the electronic device 1000 received the touch input 1020 corresponding to a horizontal drag input on the touch screen 220. When the touch input 1020 satisfies the second pressure condition, as shown in FIG. 10C, the electronic device 1000 may perform a horizontal view function as the function corresponding to the touch input 1020 corresponding to the horizontal drag input and may control the system environment of the electronic device 1000 to display a screen displayed on the touch screen 220 in a horizontal view state in which the number of horizontal pixels is greater than the number of vertical pixels. However, this is an embodiment for describing the inventive concept and the feature of the inventive concept is not limited thereto. Various functions for controlling the system environment or an application execution environment provided by the electronic device 1000 may be provided.

Figure 11:
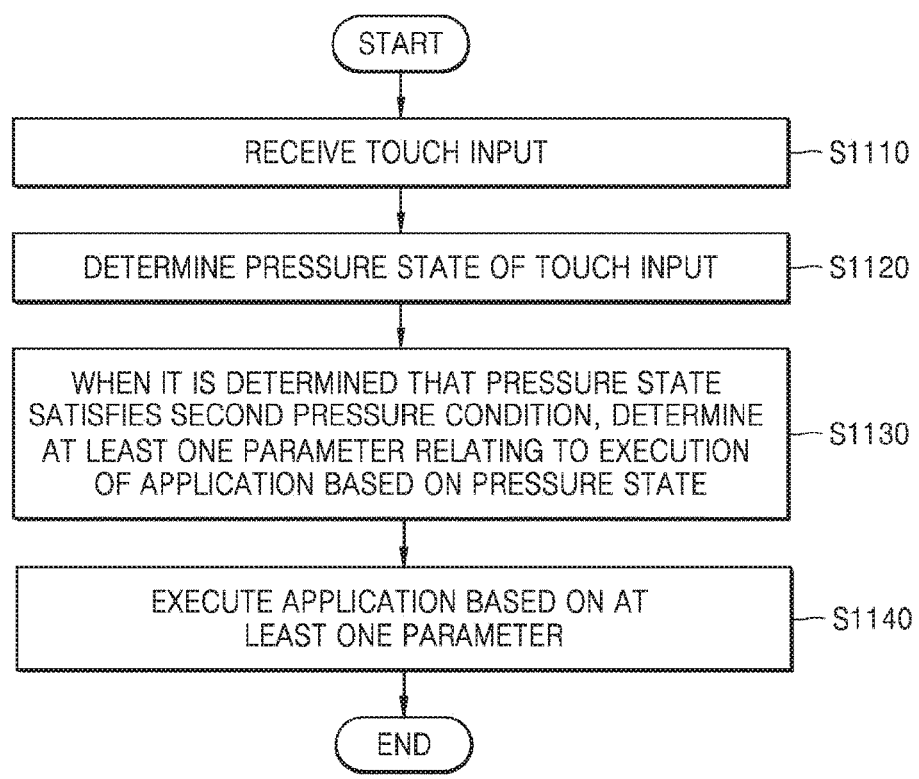
FIG. 11 is a flowchart of a process of determining a parameter relating to an execution of an application based on a pressure state when the pressure state of a touch input satisfies a second pressure condition as a method of controlling an electronic device according to an embodiment.

FIG. 11 is a flowchart of a process of determining a parameter relating to an execution of an application based on a pressure state when the pressure state of a touch input satisfies a second pressure condition as a method of controlling an electronic device according to an embodiment of the inventive concept. More specifically, when a pressure state corresponding to a received touch input satisfies the second pressure condition, a function that is to be performed may be different based on the pressure state. For example, when the pressure state corresponding to the touch input satisfies the second pressure condition, an application performing a function corresponding to information relating to the touch input may be executed, and further the parameter relating to the execution of the application may be determined based on the pressure state. For example, the parameter may be a play start location, a play volume, a play speed, etc. of media content that is to be played by the application.

Figure 12A:
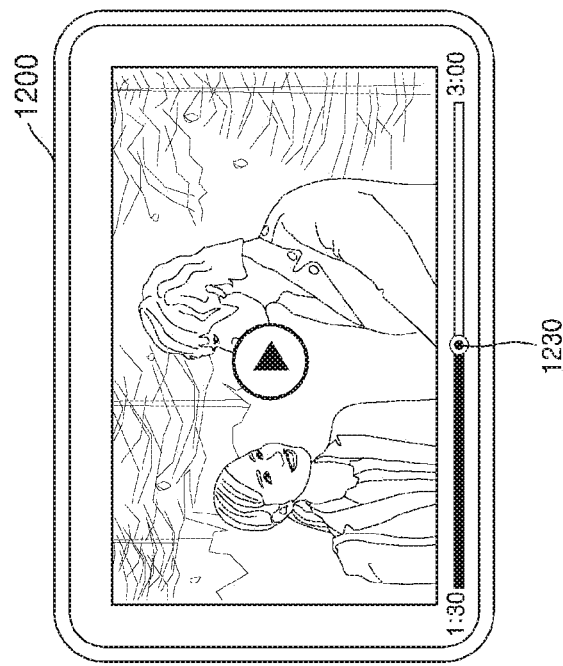
FIGS. 12A and 12B illustrate a process of determining a parameter relating to an execution of an application based on a pressure state when the pressure state of a touch input satisfies a second pressure condition as an electronic device according to an embodiment of the inventive concept.
Figure 12B:
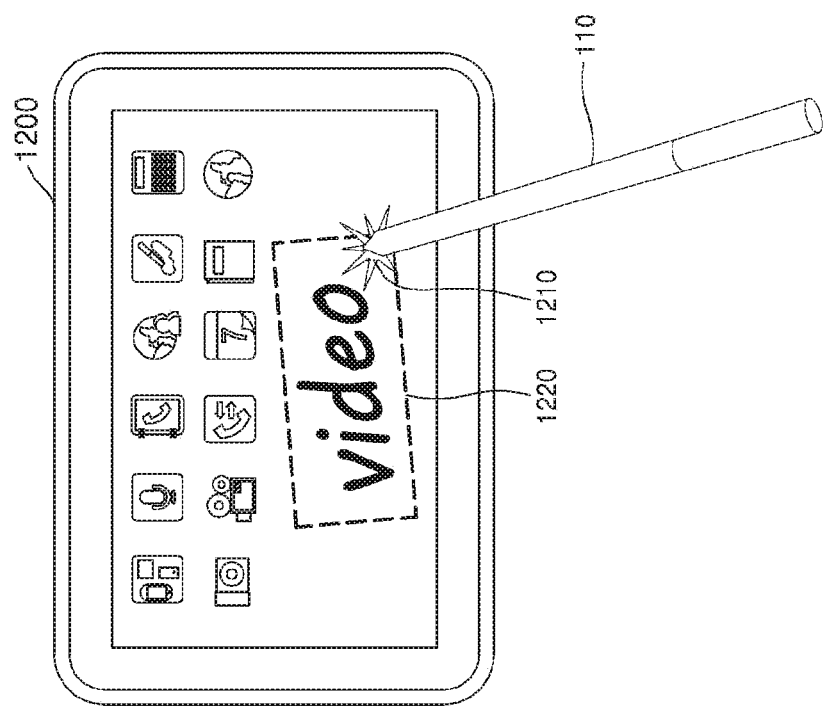

FIGS. 12A and 12B illustrate a process of determining a parameter relating to an execution of an application based on a pressure state when the pressure state of a touch input satisfies a second pressure condition as an electronic device according to an embodiment of the inventive concept. An electronic device 1200 of FIGS. 12A and 12B may correspond to the electronic device 200 of FIG. 2. The flowchart of FIG. 11 will now be described with reference to FIGS. 12A and 12B.

In operation S1110, the electronic device 1200 may receive the touch input on the touch screen 2200 by a touch unit. This may correspond to operation S410 of FIG. 4, and thus a detailed description of operation S1110 is omitted. Referring to FIG. 12A, the electronic device 1200 may receive a touch input 1210 on the touch screen 220 by using the touch device 110. The electronic device 1200 may receive the touch input 1210 like a character form "video".

In operation S1120, the electronic device 1200 may determine a pressure state of the touch input received in operation S1110. This may correspond to operation S420 of FIG. 4, and thus a detailed description of operation S1120 is omitted. Referring to FIG. 12A, the electronic device 1200 may determine if the pressure state of the received touch input 1210 satisfies a first pressure condition or the second pressure condition. According to an embodiment of the inventive concept, the electronic device 1200 may receive the touch input 1210 like the character form "video". When it is determined that the pressure state corresponding to the touch input 1210 satisfies the first pressure condition, the electronic device 1200 may display a graphic image 1220 like the character form "video" on the touch screen 220 as information relating to the touch input 1210. When it is determined that the pressure state corresponding to the touch input 1210 satisfies the second pressure condition, the electronic device 1200, the electronic device 1200 may execute a moving image play application that may perform a "moving image play function" as a function corresponding to the touch input 1210 like the character form "video". The moving image play application that may perform the moving image play function may be set by a user in advance. Although the electronic device 1200 executes applications that may perform a plurality of moving image play functions, the electronic device 1200 may automatically execute a preset application among the applications.

According to an embodiment of the inventive concept, the electronic device 1200 may determine that the pressure state of the received touch input 1210 satisfies the second pressure condition and may perform a content reproduction function such as music or a moving image as the function corresponding to the touch input 1210. Furthermore, a state of content that is to be reproduced may be preset based on receiving of the touch input 1210 satisfying the second pressure condition. For example, the electronic device 1200 may control an application performing the corresponding function to reproduce content that has been recently reproduced. Furthermore, the electronic device 1200 may determine at least one parameter relating to the execution of the application based on the pressure state of the received touch input 1210 in order to determine a state when the content that is to be reproduced starts its reproduction and may execute the application based on the determined parameter. For example, a reproduction start point of the content that is to be reproduced may be determined based on the pressure state. According to an embodiment of the inventive concept, a pressure magnitude corresponding to the pressure state may be a factor determining at least one parameter. More specifically, the electronic device 1200 may determine parameter levels according to how much the touch input satisfying the second pressure condition is and may differently determine the reproduction start point of the content as one of at least one parameter relating to the execution of the application based on each parameter value. For example, as shown in Table 1 below, the electronic device 1200 may determine the reproduction start point based on a relationship between a previously determined parameter level and the reproduction start point. Referring to Table 1, on the assumption that when the pressure magnitude is less than A, the first pressure condition is satisfied, and when the pressure magnitude is greater than A, the second pressure condition is satisfied, when a pressure magnitude determining the pressure state corresponding to the touch input 1210 is X, if X is greater than A, the touch input 1210 may be determined to satisfy the second pressure condition. When the pressure magnitude X corresponding to the touch input 1210 is greater than a8 and less than a9, the parameter level may be determined as 6, and, in this case, the reproduction start point may be determined as a point corresponding to 50% of the total reproduction time of the content. As another example, referring to Table 1, the parameter level may be determined as 6, and, in this case, the reproduction start point may be determined as a point corresponding to 50 minutes from an initial point of the total reproduction time.

TABLE 1

Parameters determined in correspondence to pressure state

| Pressure Magnitude | Parameter Level | Reproduction start point (ratio of content reproduction time and total reproduction time) | Reproduction time point (minutes) |
|---|---|---|---|
| $A \leq x < a_4$ | 1 | 0 | 0 |
| $a_4 \leq x < a_5$ | 2 | 10% | 10 |
| $a_5 \leq x < a_6$ | 3 | 20% | 20 |
| $a_6 \leq x < a_7$ | 4 | 30% | 30 |
| $a_7 \leq x < a_8$ | 5 | 40% | 40 |
| $a_8 \leq x < a_9$ | 6 | 50% | 50 |
| $a_9 \leq x < a_{10}$ | 7 | 60% | 60 |
| $a_{10} \leq x < a_{11}$ | 8 | 70% | 70 |
| $a_{11} \leq x < a_{12}$ | 9 | 80% | 80 |
| $a_{12} \leq x < a_{13}$ | 10 | 90% | 90 |

Referring to FIGS. 12A and 12B and Table 1, when the pressure state corresponding to the touch input 1210 satisfies the second pressure condition, and the pressure magnitude corresponding to the pressure state is greater than a8 and less than a9, the electronic device 1200 may determine the point corresponding to 50% of the total reproduction time of the content as the reproduction start point and may execute the application based on the reproduction start point. Thus, as shown in FIG. 12B, content having the total reproduction time of 3:00 that has been recently reproduced may be reproduced from a point corresponding to 1:30.

FIGS. 13A and 13B illustrate an operation of an electronic device 1300 when an input interface in which a touch input is to be received is generated by producing a separate window on a screen and a pressure state of the touch input applied to the input interface satisfies a second pressure condition according to an embodiment of the inventive concept. More specifically, the electronic device 1300 may execute not only one application but also simultaneously execute a plurality of applications, and, in this case, may simultaneously display applications executed on one screen. The function of providing a plurality of application execution screens may be implemented by using a multi window provided by the electronic device 1300. A window may mean an independent region or space in which an application executed by the electronic device 1300 may be executed. Windows may be independently executed, may be displayed in an overlapping state, and may change their sizes and locations. Referring to FIG. 13A, the electronic device 1300 may generate a window 1330 by using the touch device 110. The generated window 1330 may be used as an input interface. The electronic device 1300 may determine the window 1330 as the input interface and may receive a touch input 1310 performed by using the touch device 110. The electronic device 1300 may determine whether a pressure state corresponding to the touch input 1310 satisfies a first pressure condition or the second pressure condition by receiving the touch input 1310.

Referring to FIG. 0.13A, according to an embodiment of the inventive concept, when the pressure state corresponding to the touch input 1310 received by the input interface that is a region of the window 1330 satisfies the second pressure condition, an application performing a function corresponding to the touch input 1310 may be executed on the window 1330. More specifically, as shown in FIG. 13B, the electronic device 1300 may execute a moving image reproduction application performing a "moving image reproduction function" on the window 1330 since the touch input 1310 having a character form "video" satisfies the second pressure condition. Furthermore, according to an embodiment of the inventive concept, as shown in FIG. 13B, when an application is executed on the window 1330, the electronic device 1300 may determine at least one parameter related to an application execution based on the touch input 1330, which may correspond to the description provided with reference to FIG. 11, and thus its description is omitted.

A user of an electronic device 1400 may adjust power when performing a touch motion by using the touch device 110 and may adjust an intensity of the touch motion, whereas, when the touch screen 220 does not display information relating to the touch motion, the user has difficulty determining how much a current touch motion is a pressure state. Thus, the electronic device 1400 may display an arbitrary visual identifier on the touch screen 220 to directly check which pressure condition a pressure state corresponding to a touch input satisfies between a first pressure condition and the second pressure condition when performing the touch input with user's own eyes. Preferably, the visual identifier may be displayed on a space other than a region in which the touch input is performed.

Figure 14A:
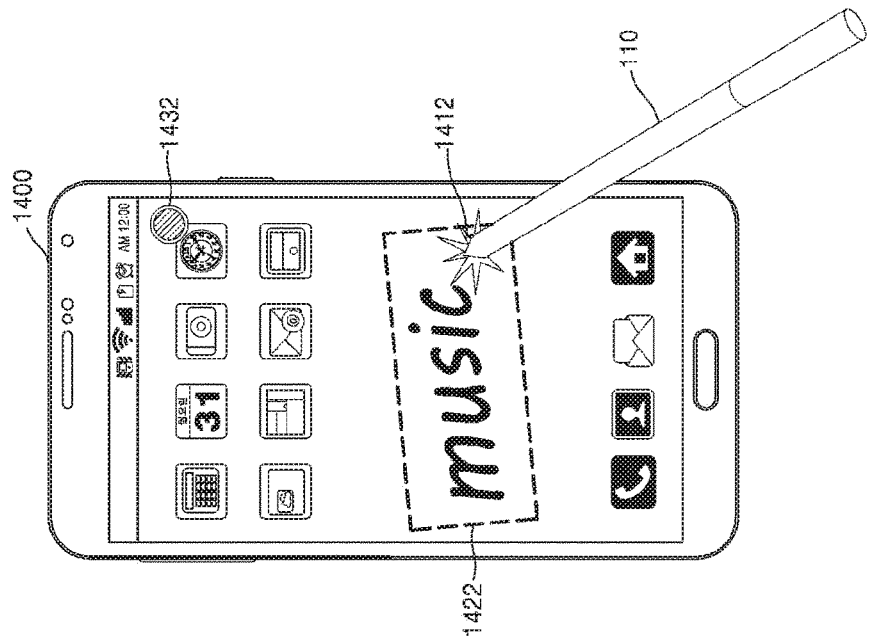
FIGS. 14A, 14B, 15A, and 15B illustrate various methods of displaying a visual indicator indicating that a pressure state corresponding to a touch input on a touch screen satisfies a first pressure condition or a second pressure condition according to an embodiment of the present invention.
Figure 14B:
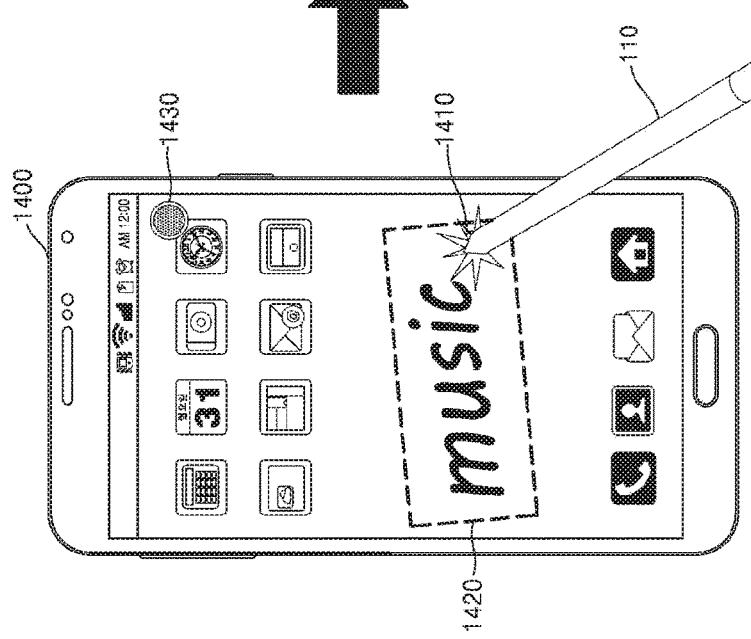

FIGS. 14A and 14B illustrate various methods of displaying a visual indicator indicating that a pressure state corresponding to a touch input on a touch screen satisfies a first pressure condition or a second pressure condition. The electronic device 1400 of FIGS. 14A and 14B may correspond to the electronic device 200 of FIG. 2. More specifically, the electronic device 1400 may receive a touch input 1410 using the touch device 110 and may determine if a pressure state corresponding to the received touch input 1410 satisfies the first pressure condition or the second pressure condition. The electronic device 1400 may display visual indicators 1430 and 1432 indicating whether a current pressure state satisfies the first pressure condition or the second pressure condition on the touch screen 220 before displaying information corresponding to the touch input 1410 when the pressure state corresponding to the touch input 1410 satisfies the first pressure state. For example, the visual indicator may be a factor that may be visually identified by the user, such as a shape, a color, a size, etc. In FIGS. 14A and 14B, the electronic device 1400 may display the visual indicators 1430 and 1432 with different colors with respect to a case where the first pressure state is satisfied and a case where the second pressure state is satisfied. In FIG. 14A, when the pressure state corresponding to the current touch input 1410 satisfies the first pressure condition, the visual indicator 1430 may be displayed on a region that does not overlap with a graphic image 1420 corresponding to a character form "music" relating to the touch input 1410 as the information corresponding to the touch input 1410. Unlike this, in FIG. 14B, when a pressure state corresponding to a current touch input 1412 satisfies the second pressure condition, the visual indicator 1432 may be displayed in a different color from shown in FIG. 14A on the region that does not overlap with the graphic image 1420 corresponding to the character form "music" relating to the touch input 1412. The user may perform the touch motion while visually checking that the visual indicators 1430 and 1432 are differently displayed on the touch screen 220 of the electronic device 1400 when the first pressure condition or the second pressure condition is satisfied. As an embodiment of the inventive concept, when the first pressure condition is satisfied, the electronic device 1400 may not display the visual indicator 1430, and, only when the second pressure condition is satisfied, may display the visual indicator 1432.

Figure 15A:
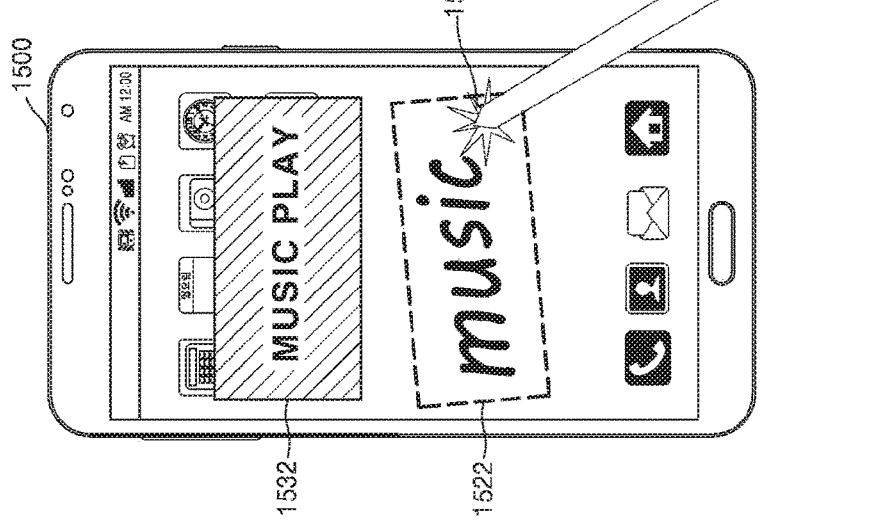
Figure 15B:
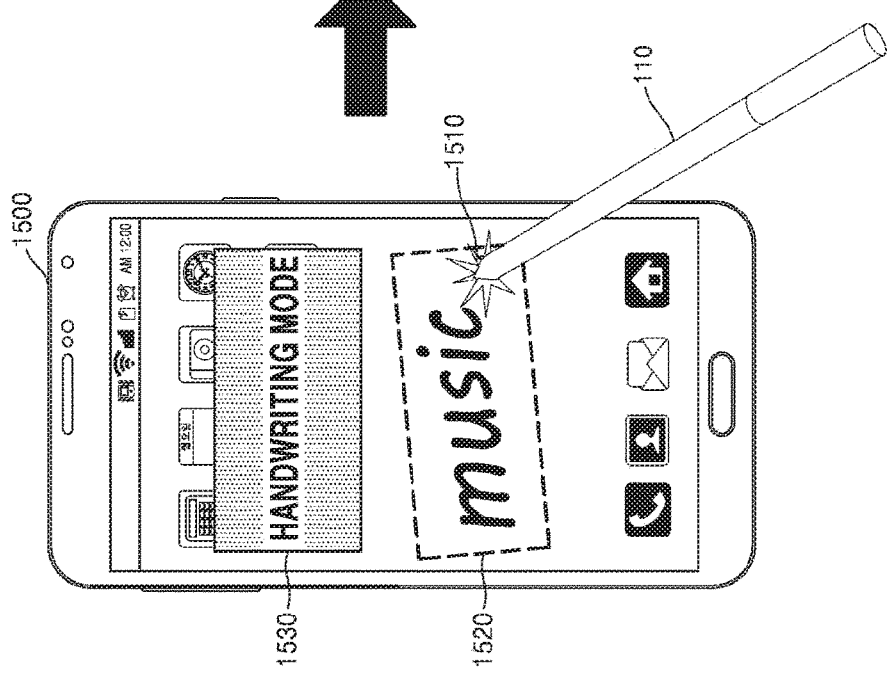

As another embodiment, in FIGS. 15A and 15B, characters as to which operation an electronic device 1500 specifically performs may be intuitively displayed as visual indicators. The electronic device 1500 of FIGS. 15A and 15B may correspond to the electronic device 200 of FIG. 2. In FIG. 15A, when a pressure state corresponding to a current touch input 1510 satisfies a first pressure condition, the electronic device 1500 may display a visual indicator 1530 on a region that does not overlap with a graphic image 1520 corresponding to a character form "music" relating to the touch input 1510 as information corresponding to the touch input 1510. In this case, when the first pressure condition is satisfied, the electronic device 1500 may intuitively display characters "handwriting mode" as to which operation to perform as visually the visual indicator 1530. Unlike this, in FIG. 15B, when a pressure state corresponding to a current touch input 1512 satisfies a second pressure condition, the electronic device 1500 may display a visual indicator 1532 on the region that does not overlap with a graphic image 1520 corresponding to the character form "music" relating to the touch input 1512 to indicate information different from shown in FIG. 15A. For example, the touch input 1512 corresponding to the character form "music" received by the electronic device 1500 satisfies the second pressure condition, and thus a music play application performing a music play function may be determined to be executed. In this case, before executing the application, characters "music play" may be displayed on the touch screen 220 as the visual indicator 1532. Alternatively, a name of the application that is to be executed may be displayed. Accordingly, a user may perform a touch motion while visually checking that the visual indicators 1530 and 1532 are differently displayed on the touch screen 220 of the electronic device 1500 when the first pressure condition or the second pressure condition is satisfied.

According to an embodiment of the inventive concept, the electronic device 200 may previously set a pressure condition that is determined to satisfy a pressure state corresponding to a touch input. Furthermore, the electronic device 200 may allow a user to change the pressure condition before receiving the touch input, thereby determining which pressure condition the pressure state corresponding to the touch input satisfies based on the changed pressure condition. Since pressure states of touch motions performed when various users usually use the electronic device 200 are various ones, the electronic device 200 may provide a function by which each user may change a pressure condition suitably to a characteristic of a touch motion.

The inventive concept may be implemented by storing computer-readable codes in a non-transitory computer-readable storage medium. The non-transitory computer-readable storage medium is any data storage device that stores data which may be thereafter read by a computer system.

The computer-readable codes are configured to execute operations of implementing the object arrangement methods according to the inventive concept when the computer-readable codes are read, from the non-transitory computer-readable storage medium, and executed by a processor. The computer-readable codes may be implemented by various programming languages. And the functional programs, codes and code segments for embodying the inventive concept may be easily construed by programmers in the art which the inventive concept belongs to.

Examples of the non-transitory computer-readable storage medium include ROM, RAM, CD-ROMs, magnetic tape, floppy disk, optical data storage devices. The non-transitory computer-readable storage medium can also be distributed over a network coupled computer system so that the computer-readable codes are stored and executed in distributed fashion.

According to one or more embodiments, an electronic device may objects corresponding to applications in an appropriate arrangement form according to an object included in a background image displayed on a display unit of the electronic device It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An electronic device configured to operate based on a touch input the electronic device comprising:
   a touch screen configured to receive the touch input;
   a memory storing one or more instructions; and
   at least one processor configured to execute the one or more instructions, wherein the at least one processor executes the one or more instructions to:
      determine a pressure state corresponding to the touch input,
      determine whether the pressure state satisfies a first pressure condition,
      perform, according to the determination that the pressure state satisfies the first pressure condition, a first function corresponding to the touch input,
      determine, as the first function is performed, whether the pressure state satisfies a second pressure condition, and
      perform, according to the determination that the pressure state satisfies the second pressure condition, a second function corresponding to the touch input,
   wherein the at least one processor is further configured to execute the one or more instructions to:
      determine whether the pressure state satisfies the first pressure condition based on a pressure intensity corresponding to the touch input,
      determine whether the pressure state satisfies the second pressure condition based on the pressure intensity corresponding to the touch input and a change of the pressure intensity, and
      determine the pressure state based on a combination of the pressure intensity corresponding to the touch input and the change of the pressure intensity.

2. The electronic device of claim 1, wherein the at least one processor further executes the one or more instructions to control the touch screen to display a visual indicator indicating the pressure state.

3. The electronic device of claim 1, wherein the at least one processor further executes the one or more instructions to, based on the touch input, change a condition corresponding to the first pressure condition or the second pressure condition.

4. The electronic device of claim 1, wherein the at least one processor further executes the one or more instructions to control the touch screen to:
   display an execution screen of an application, and
   receive the touch input to the displayed execution screen of the application.

5. The electronic device of claim 4, wherein the at least one processor further executes the one or more instructions to:
   determine a parameter corresponding to the pressure state of the touch input,
   when the pressure state satisfies the first pressure condition, perform the first function relating to the executed application based on the determined parameter, and
   when the pressure state satisfies the second pressure condition, perform the second function relating to the executed application based on the determined parameter.

6. The electronic device of claim 4,
   wherein the first function is preset to match with both a first parameter value and an identification information of the executed application, and
   wherein the first parameter value corresponds to a pressure state satisfying the first pressure condition.

7. The electronic device of claim 4,
   wherein the second function is preset to match with both a second parameter value and an identification information of the executed application, and
   wherein the second parameter value corresponds to a pressure state satisfying the second pressure condition.

8. The electronic device of claim 1, wherein the at least one processor further executes the one or more instructions to determine whether the pressure state satisfies the first pressure condition by comparing the pressure intensity corresponding to the touch input and a predetermined first threshold value.

9. The electronic device of claim 1, wherein the change of the pressure intensity comprises at least one selected from a group comprising of a pressure intensity change from a low pressure intensity to a high pressure intensity and a pressure intensity change from a high pressure intensity to a low pressure intensity.

10. The electronic device of claim 1, wherein the second function is a function performed in association with the first function.

11. A method of controlling an electronic device based on a touch input, the method comprising:
   receiving, by a touch screen, the touch input;
   determining, by at least one processor executing instructions stored in a memory, a pressure state of the touch input;
   determining, by the at least one processor executing the instructions stored in the memory, whether the pressure state satisfies a first pressure condition;
   performing, by the at least one processor executing the instructions stored in the memory, according to the determination that the pressure state satisfies the first pressure condition, a first function corresponding to the touch input;

determining, as the first function is performed, by the at least one processor executing instructions stored in the memory, whether the pressure state satisfies a second pressure condition; and performing, by the at least one processor executing the instructions stored in the memory, according to the determination that the pressure state satisfies the second pressure condition, a second function corresponding to the touch input, wherein the determining of whether the pressure state satisfies the first pressure condition comprises determining whether the pressure state satisfies the first pressure condition based on a pressure intensity corresponding to the touch input, wherein the determining of whether the pressure state satisfies the second pressure condition comprises determining whether the pressure state satisfies the second pressure condition based on the pressure intensity corresponding to the touch input and a change of the pressure intensity, and wherein the determining of the pressure state comprises determining the pressure state based on a combination of the pressure intensity corresponding to the touch input and the change of the pressure intensity.

12. The method of claim 11, further comprising: changing a condition corresponding to the first pressure condition or the second pressure condition based on a user input.

13. The method of claim 11, further comprising:
displaying an execution screen of an application; and
receiving the touch input to the displayed execution screen of the application.

14. The method of claim 13, further comprising:
determining a parameter corresponding to the pressure state of the touch input;
when the pressure state satisfies the first pressure condition, performing the first function relating to the executed application based on the determined parameter; and when the pressure state satisfies the second pressure condition, performing the second function relating to the executed application based on the determined parameter.

15. The method of claim 13,
wherein the first function is preset to match with both a first parameter value and an identification information of the executed application, and
wherein the first parameter value corresponds to a pressure state satisfying the first pressure condition.

16. The method of claim 13,
wherein the second function is preset to match with both a second parameter value and an identification information of the executed application, and
wherein the second parameter value corresponds to a pressure state satisfying the second pressure condition.

17. The method of claim 11, wherein the determining of whether the pressure state satisfies the first pressure condition comprises determining whether the pressure state satisfies the first pressure condition by comparing the pressure intensity corresponding to the touch input and a predetermined first threshold value.

18. The method of claim 11, wherein the change of the pressure intensity comprises at least one selected from a group comprising of a pressure intensity change from a low pressure intensity to a high pressure intensity and a pressure intensity change from a high pressure intensity to a low pressure intensity.

19. A non-transitory computer-readable recording medium having recorded thereon a computer program for executing the method of controlling the electronic device of claim 11.

20. The method of claim 11, wherein the second function is a function performed in association with the first function.

* * * * *